(12) United States Patent
McDowell et al.

(10) Patent No.: US 11,535,240 B2
(45) Date of Patent: Dec. 27, 2022

(54) COMPUTER CONTROLLED SOLID STATE SWITCHING DEVICE FOR ELECTRICAL SYSTEM IN A STIRLING-ELECTRIC HYBRID VEHICLE

(71) Applicant: QUANTUM INDUSTRIAL DEVELOPMENT CORPORATION, Seguin, TX (US)

(72) Inventors: Joseph S. McDowell, San Antonio, TX (US); Mirley K. Balasubramanya, San Antonio, TX (US); Kevin M. Chandler, La Vernia, TX (US); Harold J. Idell, Sedona, AZ (US)

(*) Notice: Subject to any disclaimer, the term of this patent is extended or adjusted under 35 U.S.C. 154(b) by 336 days.

(21) Appl. No.: 16/614,333

(22) PCT Filed: May 15, 2018

(86) PCT No.: PCT/US2018/032845
§ 371 (c)(1),
(2) Date: Nov. 15, 2019

(87) PCT Pub. No.: WO2018/213362
PCT Pub. Date: Nov. 22, 2018

(65) Prior Publication Data
US 2020/0148193 A1    May 14, 2020

Related U.S. Application Data

(60) Provisional application No. 62/602,999, filed on May 15, 2017.

(51) Int. Cl.
*F02G 1/043* (2006.01)
*F02G 1/045* (2006.01)
(Continued)

(52) U.S. Cl.
CPC .............. *B60W 20/40* (2013.01); *B60K 6/24* (2013.01); *B60K 6/26* (2013.01); *B60K 6/28* (2013.01);
(Continued)

(58) Field of Classification Search
CPC ...... B60W 20/40; B60W 10/06; B60W 10/08; B60W 10/30; B60K 6/24; B60K 6/26;
(Continued)

(56) References Cited

U.S. PATENT DOCUMENTS 4,064,695 A    12/1977  Bradley
5,921,764 A    7/1999   Marchionna et al.
(Continued)

*Primary Examiner* — Tisha D Lewis
(74) *Attorney, Agent, or Firm* — John A. Fortkort; Fortkort & Houston PC

(57) ABSTRACT

A control system algorithm is provided for the computer control of a solid-state switching device in a Stirling-electric hybrid vehicle. The algorithm satisfies the demands for electrical energy management, regulation, allocation and distribution to the electrical system of the vehicle during the operation thereof. The control system controls the management, regulation, allocation and distribution of electrical current throughout the vehicle's electrical system in response to the commands of the vehicle operator. This includes the operation of wheel motors, electrical storage systems, the drivetrain and a plurality of other components, accessories and subsystems.

20 Claims, 6 Drawing Sheets

(51) Int. Cl.

| | |
|---|---|
| *F02G 1/053* | (2006.01) |
| *F02G 5/02* | (2006.01) |
| *B60W 20/40* | (2016.01) |
| *B60K 6/24* | (2007.10) |
| *B60K 6/26* | (2007.10) |
| *B60K 6/28* | (2007.10) |
| *B60K 6/36* | (2007.10) |
| *B60K 7/00* | (2006.01) |
| *B60W 10/06* | (2006.01) |
| *B60W 10/08* | (2006.01) |
| *B60W 10/30* | (2006.01) |
| *F02G 1/06* | (2006.01) |

(52) U.S. Cl.
CPC .............. *B60K 6/36* (2013.01); *B60K 7/0007* (2013.01); *B60W 10/06* (2013.01); *B60W 10/08* (2013.01); *B60W 10/30* (2013.01); *F02G 1/043* (2013.01); *F02G 1/045* (2013.01); *F02G 1/0435* (2013.01); *F02G 1/053* (2013.01); *F02G 1/06* (2013.01); *F02G 5/02* (2013.01); *B60Y 2300/182* (2013.01)

(58) Field of Classification Search
CPC .......... B60K 6/28; B60K 6/36; B60K 7/0007; F02G 1/043; F02G 1/0435; F02G 1/045; F02G 1/053; F02G 1/06; F02G 5/02; F02G 2243/00; B60Y 2300/182
See application file for complete search history.

(56) References Cited

U.S. PATENT DOCUMENTS

| | | | |
|---|---|---|---|
| 6,425,362 | B1 | 7/2002 | Kanno |
| 8,562,469 | B2 * | 10/2013 | Yang ........................ B60K 6/48 |
| | | | 475/5 |
| 2005/0045392 | A1 | 3/2005 | Maslov et al. |
| 2008/0276610 | A1 | 11/2008 | McDowell |
| 2010/0277298 | A1 | 11/2010 | Leong et al. |
| 2012/0207620 | A1 * | 8/2012 | Dalum .................. B60W 20/00 |
| | | | 903/903 |
| 2014/0180516 | A1 | 6/2014 | Ueda et al. |
| 2014/0312088 | A1 | 10/2014 | Miyajima |
| 2015/0251544 | A1 | 9/2015 | Sugiyama |
| 2017/0282906 | A1 * | 10/2017 | Abe ........................ B60K 6/28 |

* cited by examiner

COMPUTER CONTROLLED SOLID STATE SWITCHING DEVICE FOR ELECTRICAL SYSTEM IN A STIRLING-ELECTRIC HYBRID VEHICLE

CROSS-REFERENCE TO RELATED APPLICATION

This application is a national stage filing of PCT/US18/32845, filed on May 15, 2018, having the same inventors and the same title, and which is incorporated herein by referenced in its entirety; which claims the benefit of priority from U.S. provisional application No. 62/602,999, filed May 15, 2017, having the same inventors and entitled "Algorithmic Methodology for Computer Control of the Electrical System in a Stirling-Electric Hybrid Automobile Drivetrain, Components, Accessories, and Subsystems", which is incorporated herein by referenced in its entirety.

FIELD OF THE DISCLOSURE

The present disclosure relates generally to Stirling-electric hybrid vehicles, and to electrical systems for the same.

BACKGROUND OF THE DISCLOSURE

The Stirling engine is a heat engine that runs on the Sterling Cycle—that is, it operates by cyclic compression and expansion of a working fluid at different temperatures, such that there is a net conversion of heat energy to mechanical work. More specifically, the Stirling engine is a closed-cycle regenerative heat engine with a working fluid that remains in a gaseous state at all times. Here, the term "closed-cycle" refers to a thermodynamic system in which the working fluid is permanently contained within the system, while the term "regenerative" describes the use of a specific type of internal heat exchanger and thermal store (known as the regenerator). The inclusion of the regenerator is a point of differentiation between a Stirling engine and other closed cycle engines that use gaseous working fluids.

Sterling engines were explored early on in the field of automotive design. Although these engines demonstrated some utility, the use of such engines was subsequently abandoned in favor of internal combustion engines. This occurred despite the fact that Stirling engines offer the greatest potential for fuel efficiency out of any of the real heat engine designs, have few noxious emissions, and can be run on a variety of fuels.

The reason for the abandonment of the Sterling engine in favor of internal combustion engines was two-fold. First of all, early Stirling engines could not generate useful amounts of power immediately after cold start, but had to be heated to an operating temperature first. By contrast, internal combustion engines can generally be used immediately after starting. Moreover, early Stirling engines were not very responsive to varying power demands, and accelerated and decelerated at significantly slower rates than internal combustion engines.

More recently, the use of Sterling engines in automobiles has been revisited, and improvements have been made in the form of hybrid systems which address some of the shortcomings on this technology. These improvements are described, for example, in U.S. Pat. No. 7,726,130 (McDowell), entitled "Sterling-Electric Hybrid Automobile".

SUMMARY OF THE DISCLOSURE

Figure 1:
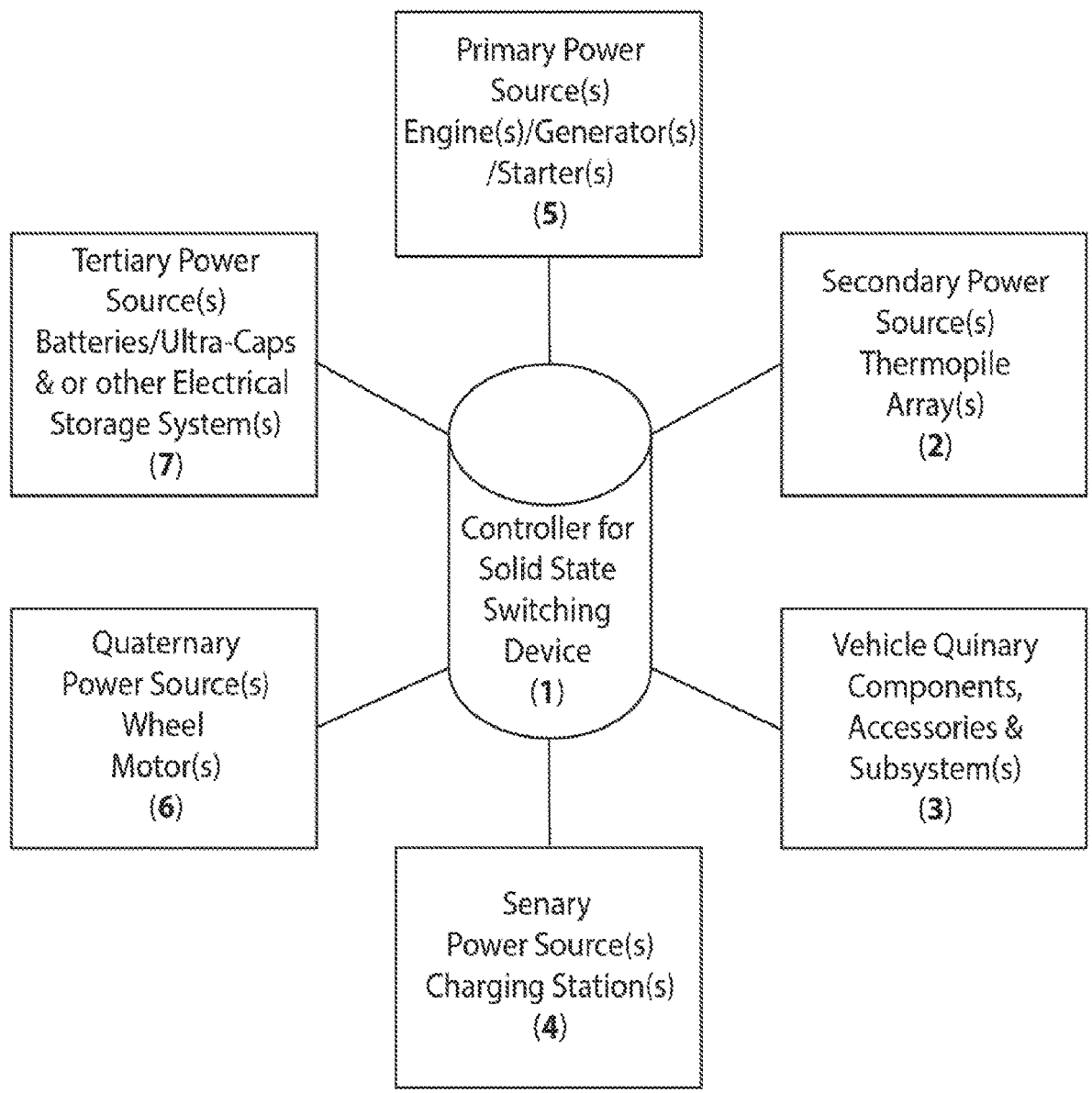
FIG. 1 is an entity relationship diagram depicting an integrated network of the various electrical power sources and electrical components accessories and subsystems in an embodiment of an electrical system for a Stirling-electric hybrid vehicle.

In one aspect, a method is provided for controlling the operation of a Sterling-electric hybrid vehicle. The method comprises providing a Sterling-electric hybrid vehicle which includes (a) an electric storage system, (b) a controller, (c) a solid-state switching device, (d) a plurality of power sources that includes a primary power source selected from the group consisting of Sterling cycle engines and Sterling cycle generators, and (e) a plurality of powered devices selected from the group consisting of vehicle components and subsystems, wherein the controller operates in conjunction with the solid state switching device to switch the mode of operation of the vehicle between an all-electric mode and a hybrid mode, and wherein the controller controls the operation of the plurality of power sources and the plurality of powered devices; receiving input selections to operate the vehicle in the all-electric mode or the hybrid mode; and if an input selection is received to operate the vehicle in the all-electric mode, then (a) ascertaining the level of charge in the electrical storage system, (b) if the level of charge in the electrical storage system is above a threshold amount, then initiating the all-electric mode, and (c) if the level of charge in the electrical storage system is not above a threshold amount, then producing an electrical current by initiating the primary power source.

In another aspect, a Sterling-electric hybrid vehicle is provided which comprises (a) an electric storage system, (b) a controller, (c) a solid-state switching device, (d) a plurality of power sources that includes a primary power source selected from the group consisting of Sterling cycle engines and Sterling cycle generators, (e) a plurality of powered devices selected from the group consisting of vehicle components and subsystems, and (f) a controller which controls the operation of the plurality of power sources and the plurality of powered devices; wherein said controller operates in conjunction with the solid state switching device to switch the mode of operation of the vehicle between an all-electric mode and a hybrid mode; wherein said controller receives input selections to operate the vehicle in the all-electric mode or the hybrid mode; and wherein, when said controller receives an input selection to operate the vehicle in the all-electric mode, the controller (i) ascertains the level of charge in the electrical storage system, (ii) if the level of charge in the electrical storage system is above a threshold amount, initiates the all-electric mode, and (iii) if the level of charge in the electrical storage system is not above a threshold amount, produces an electrical current by initiating the primary power source.

DETAILED DESCRIPTION

Electrical power systems in current production line hybrid electric vehicle (HEV) and plug-in hybrid electric vehicle (P-HEV) designs include an alternator/generator, batteries, regenerative braking, solar photovoltaic cells and one or more recharging stations. These various elements are networked by means of wired electrical cables. The alternator/generator is driven by an internal combustion engine, which also provides parallel mechanical power by means of a transmission to the wheels of the vehicle.

In a parallel hybrid electric vehicle design, both mechanical and electrical power is directed to the wheel motors for motive power. This function creates incompatibilities when the control system algorithms developed for parallel hybrid electric vehicles are applied to series hybrid electric vehicle design.

Moreover, in contrast to internal combustion engines, combustion in a Stirling Cycle engine occurs continuously and at atmospheric pressure. This mode of combustion necessitates a unique control algorithm for the operation of optimized fuel-air mixtures for efficient combustion, warm-up/start-up mode, hybrid mode, dormancy mode, zero emissions all-electric mode, shutdown sequencing mode and charge/recharge mode.

Control system algorithms currently used in production line hybrid electric vehicles or plug-in hybrid electric vehicles are typically based on parallel hybrid designs. The parallel hybrid design employs both electrical energy and mechanical energy to provide motive power to the wheels of the vehicle. The electrical power distribution algorithms employed in current production line hybrid-electric vehicles (HEV) or plug-in hybrid electric vehicles (P-HEV) regulate power throughout the vehicle's electrical system. They typically do so by managing electrical power distribution to the plurality of components and subsystems of the vehicle, and between the batteries and the drivetrain. As noted above, these parallel hybrid algorithms are incompatible with a series hybrid electric vehicle design, such as that disclosed in U.S. Pat. No. 7,726,130 (McDowell). The control system algorithm disclosed herein may be utilized to resolve this incompatibility problem.

The Stirling-electric hybrid automotive design incorporates a plurality of electrical power storage systems and a plurality of electrical power generation systems to provide for an overall improvement in efficiency over current production line HEV and P-HEV designs. Only electrical current is employed to provide motive power to the wheels of the vehicle in a series hybrid electric configuration. The plurality of electrical power sources and storage systems in the Stirling-Electric Hybrid vehicle design requires a unique control system algorithm to manage electrical power regulation, allocation and distribution throughout the vehicle drivetrain and the plurality of components, accessories and subsystems.

Accordingly, a control system algorithm for a Sterling-electric hybrid vehicle is disclosed herein which manages, regulates, allocates and distributes the flow of electrical current and manages the electrical power budget during the operation of a Stirling-electric hybrid vehicle, in a series hybrid configuration, throughout the vehicle, and among the plurality of electrical power sources, electrical storage systems, drivetrain, accessories, components and subsystems. The control system algorithm may be utilized to manage, regulate, allocate and distribute the flow of electrical current to and from a plurality of electrical power sources, including the generators or starters driven by external combustion Stirling cycle engines.

The control system algorithm may manage, regulate, allocate and distribute electrical current flow from the secondary electrical power source to the vehicle's drivetrain, components, accessories and subsystems. The secondary electrical power source may include a plurality of thermoelectric generator arrays. These thermoelectric generator arrays may utilize the Seebeck effect to convert waste heat energy or residual heat energy from the exhaust gases produced by the external combustion Stirling cycle engine into electrical current.

The control system algorithm may manage, regulate, allocate and distribute the flow of electrical current to and from the tertiary electrical power source to operate the vehicle in the plurality of modes of operation. The tertiary power source may be the electrical storage system which may include one or more Li ion batteries, ultra-capacitors, fuel cells and/or other electrical storage components which may be integrated into the vehicle's electrical system.

The control system algorithm may manage, regulate, allocate and distribute the flow of electrical current to and from the quaternary power source which may generate electrical current by dynamic means of braking (Painter, 2006) of the wheels of the vehicle, such that the rotation of the electric drive wheel motor(s) generates electrical current induction when the vehicle operator applies the brakes of the vehicle.

The control system algorithm may manage, regulate, allocate and distribute the flow of electrical current to the components and accessories in the quinary subsystems which may include, but are not limited to, various components and subsystems such as circulating coolant pumps, cooler pumps, oil pumps, radiator fans, cooler fans, air conditioning and heating components, entertainment components, safety components, and components that may control the operation of doors, seatbelts, windows, signaling components, vehicle lighting components, steering, ionizing slipstream generators (that is, an electrostatic fluid accelerator which is activated at speeds above forty-five miles per hour (72 kilometers per hour)) and other control components and subsystems for the operation of the vehicle.

The control system algorithm may manage, regulate, allocate and distribute the flow of electrical current by means of a solid-state switching device to one or more senary power sources, which may include electrical charge/recharging systems from an external electrical power source charging station or another external electrical power source. This electrical charge/recharging system may be connected to the vehicle wirelessly or by means of wiring cables to charge/recharge the plurality of components of the electrical storage systems sequential cascading and/or parallel priority.

The control system algorithm may manage, regulate, allocate and distribute the flow of electrical current to provide electrical current to the entirety of the vehicle's electrical system to include the drivetrain, components, accessories and subsystems in a sequential cascading and/or parallel priority, by means of a solid-state electrical switching device.

Additionally, the control system algorithm may manage, regulate, distribute and allocate electrical current flow, through one or more of the solid-state switching devices, to distribute electrical current generated by the wheel motors during dynamic braking to restore charge to the ultra-capacitors or the plurality of vehicle components, accessories, subsystems.

The control system algorithm may regulate the electrical current through the solid-state switching device, and electrical energy storage system, for charging/recharging of the plurality of electrical storage systems. This may be accomplished by transferring electrical charge (by means of wireless transfer of electrical charge or the transfer of electrical charge) by means of wired cables, in a sequential cascading or parallel priority algorithm, among the plurality of vehicle components, accessories, subsystems or the plurality of the electrical energy storage systems.

In a preferred embodiment, an algorithm is disclosed herein for a computer controlled electrical system in a Stirling-electric hybrid vehicle to control, manage, regulate, and allocate the distribution of electrical current throughout the vehicle's electrical system to include the drivetrain, the plurality of components, accessories and subsystems of the vehicle in accordance with a sequential cascading and/or parallel priority. This computer-controlled algorithm may control the warm-up start-up sequencing mode, the hybrid operation mode of the vehicle, the dormancy mode of operation of the vehicle, the zero emissions all-electric mode of operation of the vehicle, the shutdown sequencing mode of the operation of the vehicle and the charging/recharging operation mode of the vehicle.

During the warm-up/start-up sequencing mode of the vehicle, the vehicle operator may initiate the computer-controlled algorithm methodology which may initiate the flow of fuel from the fuel pumps and combustion air from the combustion air blower to produce a volatile fuel air mixture in the combustion chambers for ignition by the glow plugs and/or other igniting mechanism. Simultaneously to this operation, the control system algorithm may direct the solid-state switching device to direct electrical current to the drivetrain to include the wheel motors in accordance with the voltage requirements as directed by the vehicle operator's commands. The control system algorithm may direct electrical current, by means of the solid-state switching device, to other simultaneously occurring operations. These operations may include, but are not limited to, the operation of circulating pumps, coolant pumps, radiator fans, cooler fans, oil pumps, accessories, atomizing air pumps or similar devices, hydrogen compressors, working fluid/motive gas compressors, and accessories and subsystems comprising the vehicle's electrical system. Upon the working fluid, or motive gas, reaching a predetermined temperature that may sustain a Stirling cycle, the computer may direct the electrical current, by means of the solid-state switching device, to the generators/starters, to rotate the drive shaft and initiate a Stirling cycle. Once the Stirling cycle engine has reached an optimal speed of operation, the computer algorithm may then direct the solid-state switching device to direct electrical current from the generator/starter to the vehicle electrical system. This may occur in accordance with a sequential cascading and/or parallel priority of management, regulation, allocation and distribution to the vehicle drivetrain, which may include the vehicle wheel motors, components, accessories and subsystems in the default hybrid mode of operation.

The sequential cascading and/or parallel priority of electrical distribution may require that the electrical current be managed, regulated, allocated and distributed between the vehicle electrical system, the drivetrain (which includes the wheel motors) and the plurality of components, accessories and subsystems. In so doing, the highest priority is preferably given to starting with the wheel motors and Stirling Cycle engine components and vehicle control systems.

The hybrid operation mode is the default mode of vehicle operation. The hybrid mode of operation of the vehicle may be initiated by a vehicle operator command which directs the control system algorithm to initiate and continue the operation of the Stirling Cycle engine to produce electrical current (by means of the rotating generators/starters), to supply electrical current to the vehicle's electrical system, vehicle drivetrain (which includes the wheel motors), components, accessories and subsystems. Simultaneously to the production of electrical current in the foregoing manner, additional electrical current may be generated by employing the Seebeck effect to convert thermal energy from hot exhaust gases into electrical energy. This is preferably accomplished by passing these gases through thermopile arrays. The control system algorithm may direct the solid-state switching device to manage, regulate, distribute and allocate electrical current from the thermopile arrays to the vehicle's electrical system in accordance with the sequential cascading and/or parallel priority. Additional electrical current may be generated from the wheel motors during dynamic braking. Electrical current generated from dynamic braking may be directed to the ultra-capacitors. Upon reaching maximum (or near maximum) electrical charge capacity of the ultra-capacitors, the control system algorithm may direct the electrical current generated from dynamic braking, by means of the solid-state switching device, to the vehicle drivetrain (including the wheel motors), components, accessories, subsystems and throughout the vehicle's electrical system.

In the dormancy mode of operation, the control system algorithm may reduce fuel flow and combustion air flow, and/or atomizing or vaporizing air flow, to a minimal level to sustain combustion at a predetermined temperature of operation in the combustion chamber without engaging the Stirling cycle engine. The dormancy mode of operation may be initiated during periods of low electrical current demand from the vehicle's electrical system. Additionally, the control system algorithm may direct electrical current from the batteries and ultra-capacitors, and/or other electrical energy storage devices, to the vehicle's drivetrain (including the wheel motors), vehicle components, accessories and subsystems and throughout the vehicle's electrical system. Upon initiating the dormancy mode of operation while a sustained Stirling cycle is ongoing, the control system algorithm may reduce the electrical load on the generator/starter to a level to allow the Stirling cycle to reduce the speed of operation in a plurality of steps until the Stirling cycle is no longer sustained. The dormancy mode of operation may continue to operate the wheel motors, fuel pumps, combustion air blowers, atomizing and/or vaporizing air blowers, coolant pumps, cooler pumps, radiator fans, cooler fans, oil pumps and the plurality of other vehicle components, accessories and subsystems. This may be accomplished by drawing electrical current for the batteries, ultra-capacitors, electrical current generated by means of dynamic braking, and the thermopile arrays and/or other electrical energy storage devices. The dormancy mode of operation may not initiate if the predetermined level of stored electrical charge in the batteries or ultra-capacitors is insufficient to operate the plurality of systems comprising the vehicle's electrical system, drivetrain, vehicle wheel motor components, accessories and subsystems, and the control system algorithm may default to the hybrid mode of operation.

The vehicle operator may initiate a command to operate the vehicle in the zero emissions all-electric mode of operation. The zero emissions all-electric mode of operation may shut down the plurality of systems by means of the solid-state switching device, which may sustain combustion in the combustion chamber (with the exception of the combustion air blower which may continue, depending upon the temperature of the engine block). When the zero emission all-electric mode of operation is selected while a sustained Stirling Cycle is ongoing, the control system algorithm may reduce the electrical load on the generator/starter (by means of the solid-state switching device) to a level which may allow the Stirling cycle to reduce the speed of operation in a plurality of steps until the Stirling cycle is no longer sustained. Simultaneously to stopping the Stirling cycle, the plurality of systems such as the combustion air blowers, coolant circulating pumps, radiator fans, cooler pumps, and cooler fans may continue may continue to operate until a predetermined temperature in the engine block is reached. Upon reaching a predetermined temperature in the engine block, the control system algorithm may shut electrical current flow off (by means of the solid-state switching device) to the combustion air blowers, coolant circulating pumps, radiator fans, cooler pumps, and cooler fans. All of the vehicle operations may draw electrical current from the batteries and ultra-capacitors. These operations drawing electrical current include the vehicle drivetrain, which includes the wheel motors and the plurality of vehicle components, accessories and subsystems. Upon drawing down the stored electrical charge to a predetermined level of electrical charge, the zero emissions all-electric mode of operation may default to the hybrid mode of operation. If there is insufficient stored electrical charge in the ultra-capacitors and batteries or other electrical storage devices when the vehicle operator initiates the command for the zero emissions all-electric mode of operation, then the control system algorithm may default to the hybrid mode of operation.

In each of the plurality of the vehicle's modes of operation where the vehicle is moving at speeds of 45 miles per hour (72 kilometers per hour), the control system algorithm may control the activation of an ionizing slipstream generator (i.e., an electrostatic fluid accelerator) mounted on the trailing edges of the vehicle to reduce aerodynamic drag from trailing vorticity airflow by redirecting the airflow electrostatically. If the mode of operation of the vehicle reduces to or maintains speeds of less than 45 miles per hour (72 kilometers per hour), the control system algorithm may disengage (or not engage) the ionizing slipstream generator (i.e., the electrostatic fluid accelerator).

To shut down the vehicle, the vehicle operator may initiate the command for the shutdown mode of operation. When the shutdown mode of operation is selected by the vehicle operator, the control system algorithm may cut the flow of electrical current to the wheel motors. If the shutdown mode of operation is initiated while a sustained Stirling cycle is ongoing, the control system algorithm may reduce the electrical load on the generator/starter to a level to allow the Stirling cycle to reduce the speed of operation in a plurality of steps until the Stirling cycle is no longer sustained. The control system algorithm may continue to direct electrical current to the combustion air blowers, coolant circulating pumps, radiator fans, cooler pumps, cooler fans, and oil pumps until the engine block reaches a predetermined temperature. Residual electrical power generated by the thermopile arrays may be directed to the plurality of electrical storage systems such as the ultra-capacitors, batteries and/or other electrical storage devices.

The vehicle operator may initiate the command to place the vehicle in the charge/recharge mode of operation. Upon selecting to initiate the charge/recharge mode of operation, the vehicle operator may connect the vehicle to an external electrical power supply to charge the ultra-capacitors, batteries or other electrical storage devices. Once the vehicle is connected to an external power supply (either by means of electrical cables or wirelessly by means of resonant circuitry), the control system algorithm may direct the solid-state switching device to first conduct the electrical current to the plurality of ultra-capacitors at a rate of electrical current flow optimal for the plurality of ultra-capacitors. Upon the ultra-capacitors reaching a maximum (or near maximum) charge, the control system algorithm may alter the rate of electrical current flow for optimal charging/recharging the plurality of batteries or other electrical storage devices. Upon the plurality of the electrical storage devices reaching a maximum or near maximum storage of electrical charge, the control system algorithm may shutdown the flow of electrical current from the external electrical power supply to the vehicle's electrical storage systems.

The systems and methodologies disclosed herein may be further understood with reference to the attached drawings and the particular, non-limiting embodiments of the systems and methodologies disclosed therein.

FIG. 1 is an entity relationship diagram depicting a particular, non-limiting embodiment of an integrated network of the various electrical power sources, electrical component accessories and subsystems of an electrical system for a Stirling electric hybrid vehicle in accordance with the teachings herein. The controller for the solid-state switching device 1 may be directed by the control system algorithm to manage, regulate, allocate and distribute the electrical current flow between a plurality of the various electrical power sources in one-way or two-way flow of electrical current and provide for electrical current to the drivetrain and the plurality if components, accessories and subsystems. Specific components, accessories and subsystems of the vehicle electrical system may only have one-way flow of electrical current. These components, accessories and subsystems may include the thermoelectric generator arrays 2, which may only have electrical current flowing from the plurality of thermopile arrays to the vehicle's electrical system by means of solid-state switching device. One-way flow of electrical current may be directed by the control system algorithm to the vehicle components, accessories and subsystems 3 by means of the solid-state switching device. The vehicle drivetrain, components accessories and subsystems may include, but may not be limited to, the wheel motors, the vehicle lighting, vehicle compartment air conditioning and heating, radio and/or entertainment components, oil pumps, coolant pumps, radiator fans, circulating pumps, cooler fans, combustion air blowers, fuel pumps, safety devices, and the plurality of components and subsystems typically found in a vehicle.

The quinary, senary and any and all other subsequent electrical power sources 4 may also be subject to one-way flow of electrical current. The senary electrical power sources may include subsystems, accessories and components of charging/recharging stations, which may operate (either wirelessly by means of resonant circuitry or by means of cable wiring systems) to provide for charging/recharging the plurality of electrical power storage systems. Such electrical power storage systems may include, but may not be limited to, batteries, ultra-capacitors 7, and other electrical energy storage devices.

Two-way flow of electrical current may include the primary electrical power source of the engine/generator/starter 5. When starting the Stirling Cycle engine, the control system algorithm may direct electrical current to flow to the generator (by means of the solid-state switching device) to rotate the crank shaft and initiate a sustained Stirling cycle. Upon the Stirling cycle engine sustaining the Stirling cycle, the flow of electrical current may be reversed by the algorithmic methodology to flow from the generator to the solid-state switching device for management, regulation, allocation and distribution throughout the electrical system of the vehicle in accordance to the algorithmic methodology of sequential cascading and/or parallel priority. The demands for electrical power of the vehicle's electrical system may be satisfied by drawing electrical current from the tertiary power source 7 to provide for electrical current to turn the wheel motors for motive power. When electrical current flows to the wheel motors, the wheels turn to provide traction to move the vehicle. Electrical current may reverse flow from the wheel motors when brakes are applied. This occurs via a dynamic braking methodology, which may be utilized to generate electrical current by means of induction from the rotation of the wheel motors, and which provides some resistance in addition to the wheel brakes. The electrical current generated by means of dynamic braking may be routed though the solid-state switching device for distribution to the ultra-capacitors 7 or other electrical storage devices for electrical energy storage, or may be directed to the components, accessories and subsystems.

Figure 2:
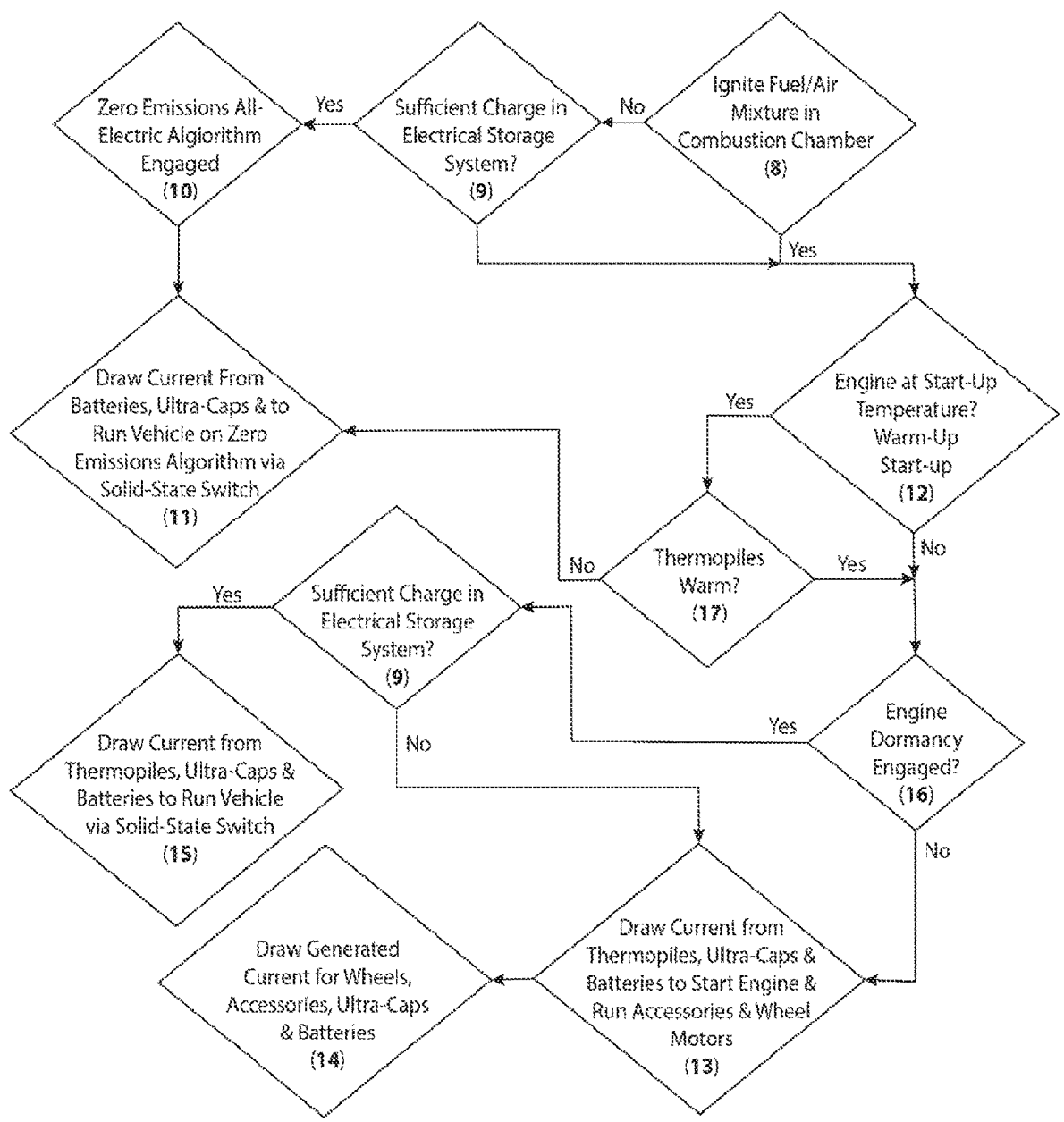
FIG. 2 is an entity relationship diagram depicting an embodiment of an algorithm for controlling the plurality of modes of operation of a Stirling-electric hybrid vehicle.

FIG. 2 is an entity relationship diagram depicting a particular, non-limiting embodiment of a methodology for the control of the plurality of modes of operation of a Stirling-electric hybrid vehicle. The vehicle operator may choose to operate the vehicle in the zero emissions all-electric mode. This may result in the shutdown of the flow of fuel from the fuel pumps to the combustion chambers such that no combustion takes place in the combustion chambers of the Stirling cycle engine in operation 8. This, in turn, may result in triggering operation 9, which includes assessing the level of charge in the electrical storage system (consisting of the tertiary power source 7) to ensure that there is sufficient charge to initiate the zero emissions all-electric mode of operation 10.

Once sufficient charge to operate the vehicle is ascertained, the zero emissions all-electric mode of operation 10 may then draw current from the batteries and ultra-capacitors in the tertiary power source 7 by means of the solid-state switching device in operation 11. If there is insufficient charge in the electrical storage system (which consists of a plurality of batteries and ultra-capacitors in the tertiary power source 7), then the controller 1 may automatically light off the fuel in the combustion chambers of the Stirling cycle engine/generator to produce electrical current from the primary power source 5. Once the warm-up, start-up process 12 determines that the Stirling cycle engine is at a sufficient operating temperature to sustain the Stirling cycle, the controller 1 may reverse the electrical current flow to the generator/starter from the batteries and/or ultra-capacitors in the tertiary power source 7 to rotate the crank shaft of the Stirling cycle engine/generator/starter and start a sustained Stirling cycle by means of the solid-state switching device and controller 1.

Once the Stirling cycle is sustained, the controller 1 may direct the flow of electrical current to reverse. This causes electrical current to flow from the primary power source 5, to the wheel motors 6 and vehicle accessories 3, by means of the solid-state switching device at voltage levels as determined by the vehicle operator.

The vehicle operator may choose to operate the vehicle in the dormancy mode by choosing to ignite the fuel air mixture in the combustion chamber by means of the ignition operation 8. This begins combustion in the combustion chamber of the Stirling cycle engine 5, but without initiating a sustained Stirling cycle in the primary power source 5, by bypassing the warm-up start-up process 12 and engaging the dormancy mode of operation 16.

The dormancy mode of operation may generate hot exhaust gas from the combustion of the fuel air mixture in the combustion chamber, and may result in a flow of exhaust gasses through the exhaust system to pass through the plurality of thermopile arrays in the secondary power source 2. This results in the production of electrical current by means of the Seebeck effect once there is a sufficient temperature difference ($\Delta T$) across the thermopile array, in accordance with operation 17.

The controller 1 may direct electrical current generated by the secondary power source 2, in combination with electrical power from the tertiary power source 7, to the wheel motors 6 and to other vehicle components, accessories and subsystems 3, by means of the solid-state switching device in accordance with operation 15. In some situations, there may be insufficient stored electrical charge in the tertiary power source 7 to augment the power from the thermopile arrays in the secondary power source 2 to operate the vehicle's drivetrain, components, accessories and subsystems. In such situations, the controller 1 may start the Stirling cycle engine by directing a reverse electrical current flow, by means of the solid-state switching device in operation 13, to the Stirling cycle engine/generator/starter. This rotates the crank shaft and initiates a sustained Stirling cycle. Once the Stirling cycle engine is able to sustain the Stirling cycle, the flow of electrical current may reverse direction to flow from the generator/starter to the solid-state switching device for distribution throughout the electrical system of the vehicle in accordance to the controller's 1 sequential cascading or parallel priority algorithm.

The vehicle operator may choose to operate in the series electric hybrid mode of operation, which may be the default mode of operation. The series electric hybrid mode of operation may be initiated upon a command from the vehicle operator, which may begin the ignition sequence by igniting the fuel air mixture in the combustion chamber in accordance with operation 8. Once the Stirling cycle engine reaches the optimal operating temperature for a sustained Stirling cycle in accordance with operation 12, the controller 1 (by means of the solid-state switching device) may direct electrical current to the generator/starter to rotate the crank shaft of the Stirling Cycle engine and establish a sustained Stirling Cycle.

Once a sustained Stirling cycle is established by operation 12, electrical current may flow from the generator/starter to the vehicle's electrical system to provide electrical current to the vehicle drivetrain, including the wheel motors 6 and vehicle components, accessories and subsystems 3. During the warm-up start-up in operation 12, and before the Stirling cycle engine reaches optimal operating temperature (as determined by operation 12), the electrical current needed to operate the vehicle drivetrain and the vehicle's wheel motors, components, accessories and subsystems may be drawn initially from the tertiary power source 7. This operation may be executed in the zero emission all-electric mode of operation as described above to provide electrical current to the vehicle wheel motors 6 and the vehicle drivetrain, components, accessories and subsystems 3. Upon the thermopile arrays reaching a sufficient $\Delta T$ to generate electrical current by means of the Seebeck effect, the controller 1 may draw electrical current from the thermopile arrays in the secondary power source 2 to augment the electrical current drawn from the tertiary power source 7, as executed in the dormancy mode of operation as described above. This allows the controller to meet the demands for electrical current to the vehicle drivetrain, wheel motors 6 and vehicle components, accessories and subsystems 3, as determined by the vehicle operator by means of the controller 1, by means of the solid-state switching device. While the vehicle is in the series hybrid electric mode of operation, the controller 1 may, from time to time, default to the dormancy mode in accordance (with operation 16, as described above, and by means of the solid-state switching device) when a predetermined sufficient level of electrical charge is stored in the tertiary power source 7. Operation of the vehicle drivetrain, vehicle wheel motors 6, and the vehicle components, accessories and subsystems 3 in this mode may reduce emissions from the Stirling Cycle engine and may reduce fuel consumption.

Figure 3:
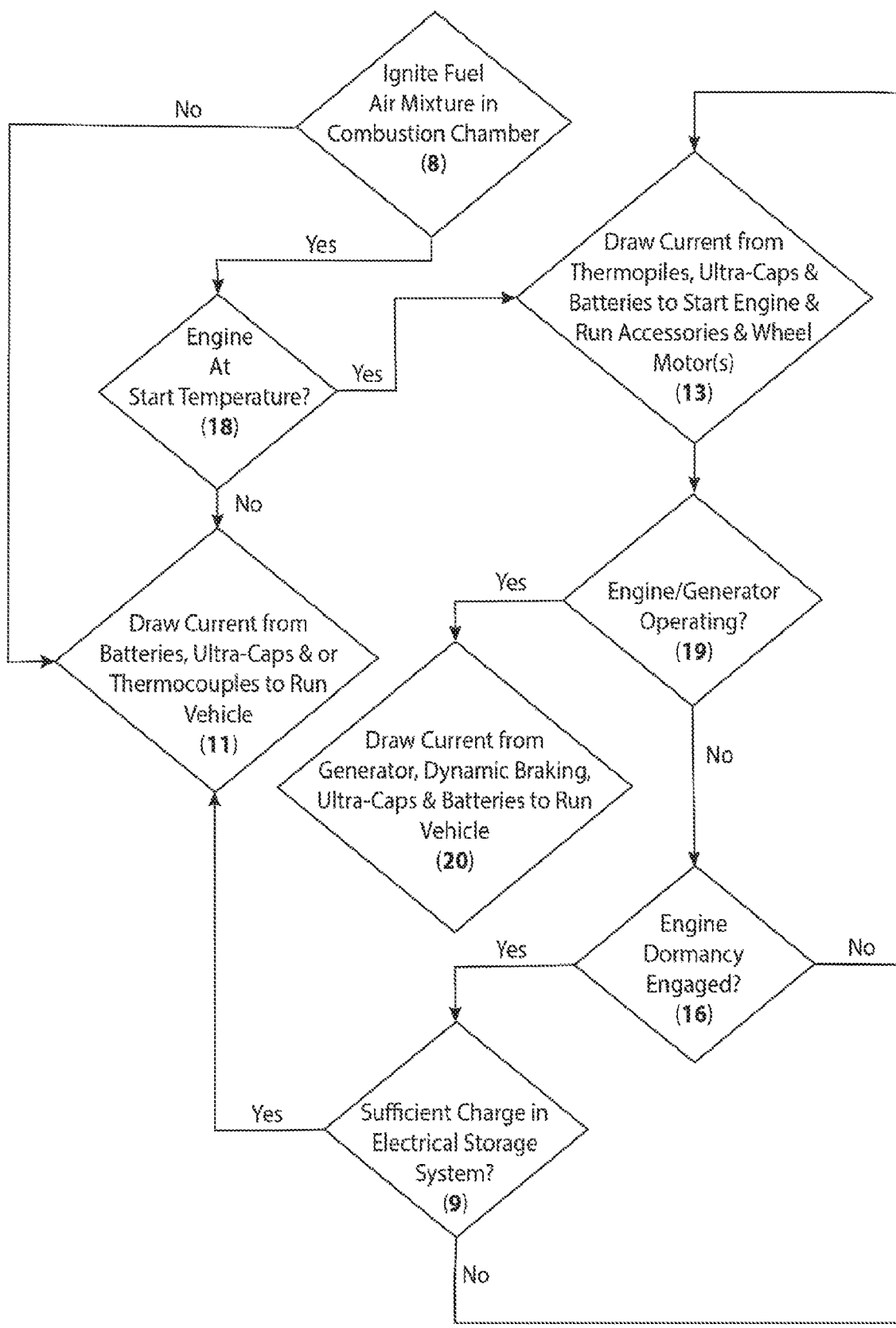
FIG. 3 is an entity relationship diagram for an algorithm for the warm-up/start-up sequence inherent in igniting the fuel air mixture in the combustion chambers of a Stirling cycle engines during the operation thereof.

FIG. 3 is an entity relationship diagram of a particular, non-limiting embodiment of the system control algorithm. This diagram depicts the warm-up/start-up sequence inherent in igniting the fuel air mixture in the combustion chamber of the Stirling cycle engine in operation 8. Until the Stirling Cycle engine is at an optimal operating temperature to sustain a Stirling cycle, electrical current for the vehicle drivetrain, the vehicle's wheel motors 6, components, accessories and subsystems 3, may be drawn from the plurality of batteries or ultra-capacitors by means of the solid-state switching device in operation 11.

When the Stirling cycle engine fuel air mixture in the combustion chamber is ignited in operation 8, the control system algorithm may default to operation 18 to determine if the internal motive gas has reached the optimal operating temperature. In operation 18, if the internal motive gas is at an optimal operating temperature, then the algorithmic methodology may default to operation 12 to initiate the Stirling cycle. This causes electrical current to be directed to the generator/starter which may rotate the crank shaft of the Stirling cycle engine to initiate a sustained Stirling cycle.

Once the Stirling cycle engine is operating with a sustained Stirling cycle, electrical current may be drawn, by means of the solid-state switching device, from the primary power source 5, the secondary power source 2, and the tertiary power source 7 to provide electrical power to the vehicle drivetrain, wheel motor 6, and vehicle components accessories and subsystems 3 in operation 20.

If the motive gas has not reached the optimal operating temperature to sustain a Stirling cycle, then the vehicle control algorithm may default to operation 11. In the default operation 11, electrical current is drawn from the plurality of batteries, ultra-capacitors or thermopile arrays to provide electrical current to vehicle wheel motors, components, accessories and subsystems.

If the fuel air mixture in the combustion chamber is not ignited, then the algorithm defaults to operation 10, which may draw electrical current from the batteries, ultra-capacitors or the thermopile arrays to power the vehicle's wheel motors, components, accessories and subsystems. If operation 19 of the algorithm determines that the Stirling cycle engine is operating with a sustained Stirling cycle, then electrical current may be drawn from the generator/starter to provide electrical current to the wheel motors, batteries, ultra-capacitors, and the vehicle drivetrain, components, accessories and subsystems.

If operation 19 determines that the Stirling cycle engine and generator/starter are not operating with a sustained Stirling cycle, then the algorithm may default to operation 16 to determine if the engine dormancy mode of operation is engaged. Operation 16 determines if engine dormancy mode of operation is engaged, then operation 9 determines if there is sufficient electrical charge in the electrical power storage system (which may include, but is not limited to, the batteries and ultra-capacitors or other electrical storage devices) to provide electrical current to the wheel motors and vehicle components, accessories and subsystems to operate the vehicle for a predetermined minimal time period under a predetermined electrical load. If operation 9 determines that there is sufficient charge in the electrical power storage system, then the engine dormancy mode of operation 16 may remain engaged, and then operation 11 may draw electrical current from the batteries, ultra-capacitors or electrical current generated from the thermopile array.

If operation 9 determines that there is insufficient stored electrical charge to operate the vehicle for a predetermined minimal time period under a predetermined electrical load, then the default operation may be operation 13. Operation 13 draws electrical current from the thermopile array, ultra-capacitors, and batteries to initiate a Stirling cycle by means directing electrical current to the generator/starter and electrically rotating the crank shaft. Once a sustained Stirling cycle is initiated, electrical current may be drawn from generator/starter, batteries, ultra-capacitors and thermopile array to manage, regulate allocate and distribute electrical current to power the vehicle drivetrain, including the wheel motors, components, accessories and subsystems.

Figure 4:
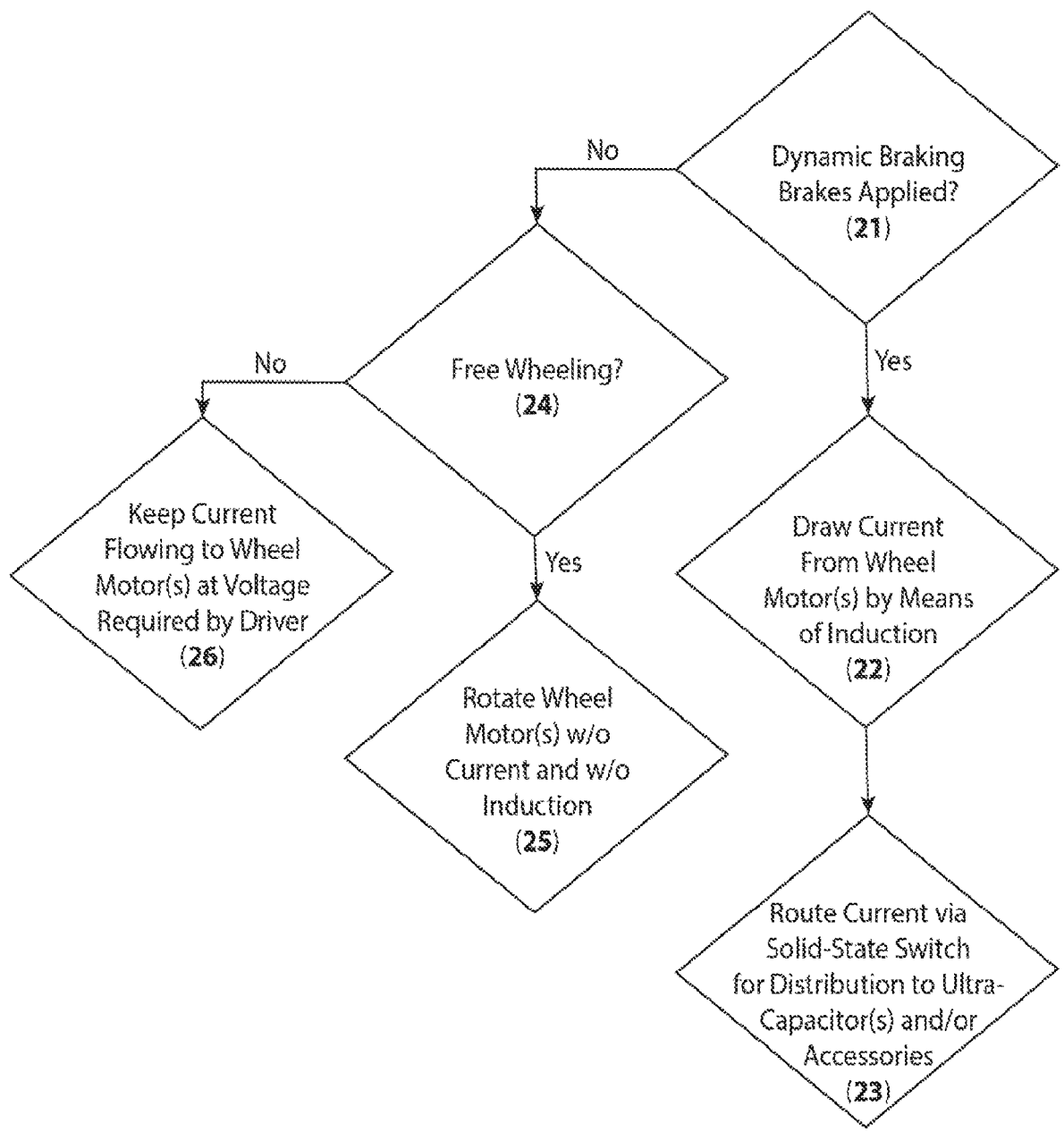
FIG. 4 is an entity relationship diagram depicting the operations involved in the distribution and regulation of the electrical current generated during dynamic braking of a Stirling-electric hybrid vehicle.

FIG. 4 is an entity relationship diagram depicting particular, non-limiting embodiments of the operations involved in the distribution and regulation of the electrical current generated during dynamic braking of the vehicle. When the vehicle brakes are applied by the vehicle operator, electrical current may stop flowing to the wheel motors in accordance with operation 21. The rotation of the wheel motors may create an electrical induction current which may be drawn from, and directed to, the solid-state switching device by the controller 1, in accordance with operation 22. The electrical current generated by the rotation of the wheel motors may be managed, regulated, allocated and distributed to the ultra-capacitors or the components or accessories as determined by the level of stored electrical charge in the ultra-capacitors in operation 23.

In operation 24, if the vehicle is moving due to inertia but the vehicle operator has not applied the brakes and is not directing electrical voltage to the wheel motors, the wheel motors may not employ induction and the wheel motors may rotate freely in operation 25. In operation 24, if the vehicle operator is directing voltage to the wheel motors to provide for traction to move the vehicle, then electrical current may be directed from the batteries, the generator/starter or the thermopile array to meet the voltage demands required by the vehicle operator in operation 26.

Figure 5:
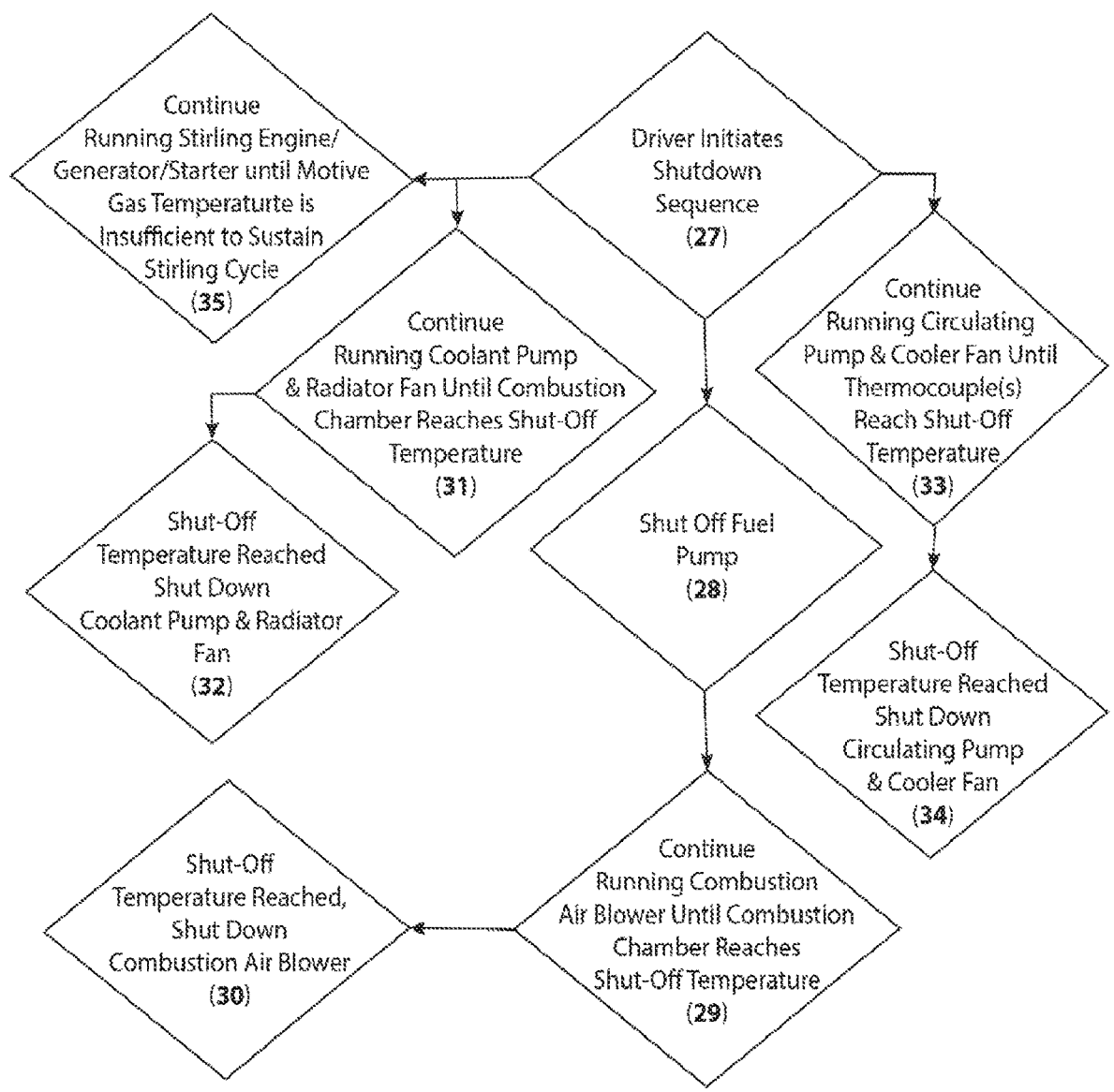
FIG. 5 is an entity relationship diagram depicting the shutdown sequence of a Stirling-electric hybrid vehicle.

FIG. 5 is an entity relationship diagram depicting a particular, non-limiting embodiment of a shutdown sequence for the Stirling-electric hybrid vehicle. When the vehicle operator initiates the shutdown sequence in operation 27, the flow of fuel from the fuel pump to the combustion chamber may be shut off. This operation may be performed mechanically, electrically or electro-mechanically in operation 28. The flow of combustion air may continue to blow through the combustion chamber to vent through the exhaust system in operation 29 until a predetermined combustion chamber temperature is reached. Upon reaching a predetermined temperature in the combustion chamber, the combustion air blower may be shut off in operation 30. Simultaneously with operation 28 of the shutdown sequence, operation 31 may continue to operate components and subsystems (which may include the coolant pumps) to circulate coolant fluid and to run the radiator fan. Once a predetermined temperature is reached in the combustion chamber, the coolant pump and radiator fan may be shut off in operation 32.

Simultaneously with operation 28, the shutdown sequence may run the circulating pumps and cooler fan, which may be employed to conduct heat energy away from the thermopile array until a predetermined shutdown temperature in the combustion chamber is reached in accordance with operation 33. Once the pre-determined temperature is reached in the combustion chamber, the circulating pump and cooler fan in the thermopile array may be shut off in accordance with operation 34. Simultaneously to the operation in 28, 31, and 33, the Stirling cycle engine/generator/starter may continue to operate until the temperature of the motive gas reaches a temperature which may be insufficient to sustain a Stirling cycle. This may cause the Stirling cycle engine to stop cycling in accordance with operation 35.

Figure 6:
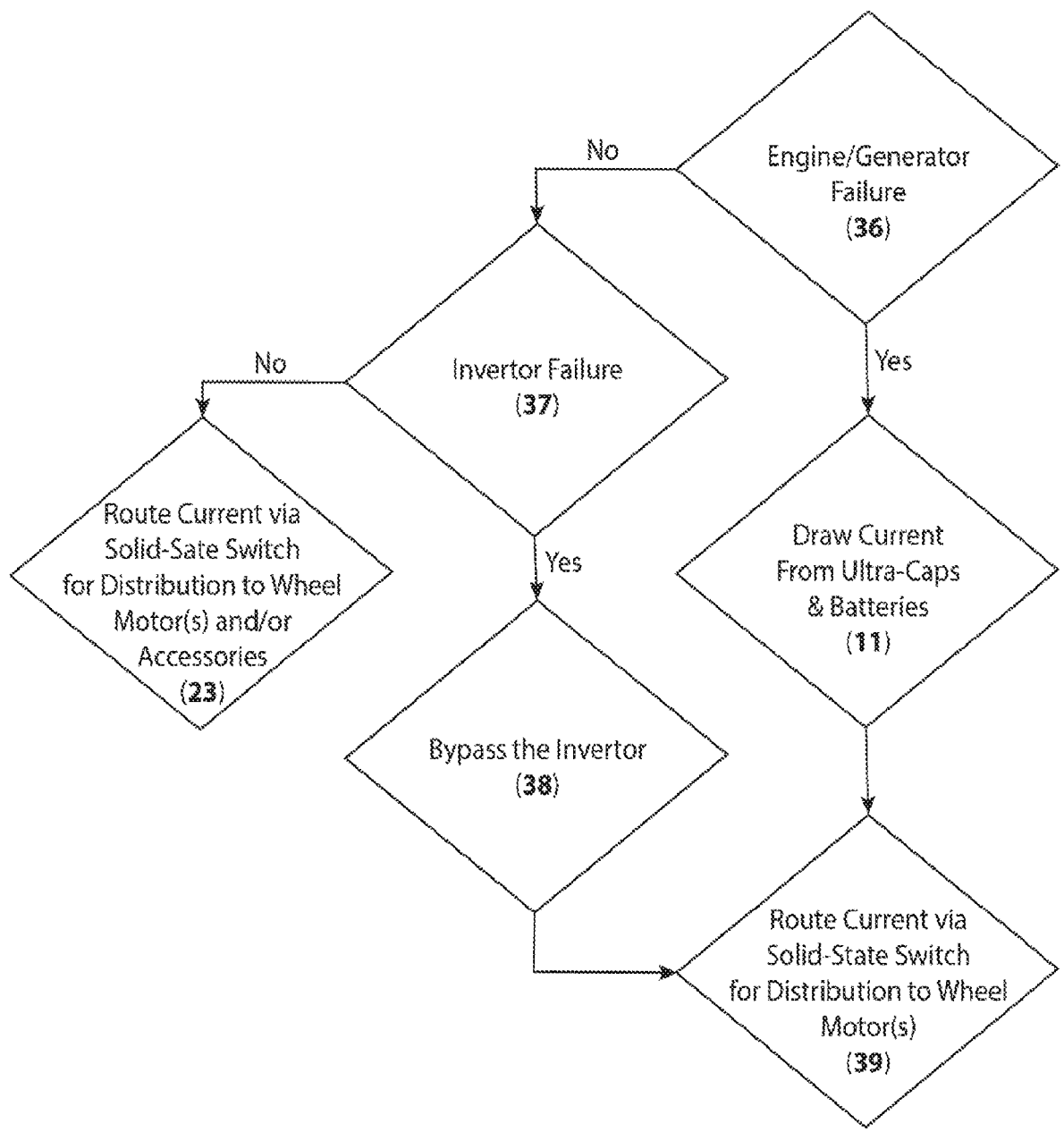
FIG. 6 is an entity relationship diagram depicting a failure mode of either the inverter or the engine/generator of a Stirling-electric hybrid vehicle.

FIG. 6 is an entity relationship diagram depicting a particular, non-limiting embodiment of a failure mode of either the inverter or the engine/generator. Should a failure or fault in the operation of the engine/generator/starter occur, the control system algorithm preferably defaults to the all-electric zero emissions operation 11. If no failure or fault in the operation of the engine/generator/starter occurs, the algorithmic methodology determines if there is a failure or fault in the inverter in operation 37. If a failure or fault is present in the inverter, then the inverter is bypassed in operation 38 to provide power to the wheel motors and braking system, but no electrical current is directed to the accessories in operation 39. If no faults or failures are detected in either operation 36 or operation 37, then the vehicle will operate in accordance with operation 23 and may direct electrical current to the wheel motors and or accessories.

The technical problems that the current invention resolves are not limited to those mentioned above, and those that are not mentioned, shall be clearly understood by a person, or persons, skilled in the art, by examining the present invention disclosed herein.

As used herein, unless otherwise specifically noted, the term "or" shall mean "and/or". Moreover, in the systems and methodologies described herein, if reference to a component is made in the singular, multiple instances, of that component may be utilized without departing from the scope of the disclosure. Similarly, if reference to a component is made in the plural, a single instance of that component may be utilized without departing from the scope of the disclosure.

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly indicates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure relates. Suitable methods and compositions are described herein for the practice or testing of the compositions, systems and methodologies described herein. However, it is to be understood that other methods and materials similar or equivalent to those described herein may be used in the practice or testing of these compositions, systems and methodologies. Consequently, the compositions, materials, methods, and examples disclosed herein are illustrative only, and are not intended to be limiting. Other features of the disclosure will be apparent to those skilled in the art from the following detailed description and the appended claims.

Unless otherwise indicated, all numbers expressing quantities of components, percentages, temperatures, times, and so forth, as used in the specification or claims are to be understood as being modified by the term "about." Unless otherwise indicated, non-numerical properties such as colloidal, continuous, crystalline, and so forth as used in the specification or claims are to be understood as being modified by the term "substantially," meaning to a great extent or degree. Accordingly, unless otherwise indicated implicitly or explicitly, the numerical parameters and/or non-numerical properties set forth are approximations that may depend on the desired properties sought, the limits of detection under standard test conditions or methods, the limitations of the processing methods, and/or the nature of the parameter or property. When directly and explicitly distinguishing embodiments from discussed prior art, the embodiment numbers are not approximations unless the word "about" is recited.

The above description of the present invention is illustrative and is not intended to be limiting. It will thus be appreciated that various additions, substitutions and modifications may be made to the above described embodiments without departing from the scope of the present invention. Accordingly, the scope of the present invention should be construed in reference to the appended claims.

Moreover, it is specifically contemplated that the features described in the appended claims may be arranged in different combinations or sub-combinations without departing from the scope of the present disclosure. For example, it is contemplated that features set forth in two or more claims may be combined into a single claim without departing from the scope of the present disclosure, whether or not the resulting combination of features is explicitly disclosed elsewhere in the appended claims or disclosure.

What is claimed is:

1. A method for controlling the operation of a Sterling-electric hybrid vehicle, comprising:
   providing a Sterling-electric hybrid vehicle which includes
   (a) an electric storage system,
   (b) a controller,
   (c) a solid-state switching device,
   (d) a plurality of power sources that includes a primary power source selected from the group consisting of Sterling cycle engines and Sterling cycle generators, and
   (e) a plurality of powered devices selected from the group consisting of vehicle components and subsystems, wherein the controller operates in conjunction with the solid state switching device to switch the mode of operation of the vehicle between an all-electric mode and a hybrid mode, and wherein the controller controls the operation of the plurality of power sources and the plurality of powered devices;
   receiving input selections to operate the vehicle in the all-electric mode or the hybrid mode; and
   if an input selection is received to operate the vehicle in the all-electric mode, then (a) ascertaining the level of charge in the electrical storage system,
(b) if the level of charge in the electrical storage system is above a threshold amount, then initiating the all-electric mode, and
(c) if the level of charge in the electrical storage system is not above a threshold amount, then producing an electrical current by initiating the primary power source;
wherein the Sterling cycle engine is equipped with a crank shaft, and wherein, if an input selection is received to operate the vehicle in the hybrid mode, then:
determining whether the Sterling cycle engine is at a sufficient operating temperature to sustain a Stirling cycle; and
if the Sterling cycle engine is at a sufficient operating temperature to sustain a Stirling cycle, then rotating the crank shaft to commence a sustained Sterling cycle.

2. The method of claim 1, wherein the controller manages, regulates, allocates, and distributes electric current between the plurality of power sources and the plurality of powered devices.

3. The method of claim 1, wherein the plurality of powered devices includes at least one element selected from the group consisting of engines, generators and starters.

4. The method of claim 1, wherein the plurality of powered devices includes a drivetrain.

5. The method of claim 1, wherein the plurality of powered devices includes a thermopile array.

6. The method of claim 1, wherein the plurality of powered devices includes a charging station.

7. The method of claim 1, wherein the plurality of powered devices includes at least one element selected from the group consisting of batteries and ultracapacitors.

8. The method of claim 1, wherein the plurality of powered devices includes at least one device selected from the group consisting of wheel motors, illumination devices, air conditioning system components, heating system components, entertainment system components, pumps, fans, and combustion air blowers.

9. The method of claim 1, wherein the plurality of powered devices includes an in-wheel motor.

10. The method of claim 7 wherein, if the level of charge in the electrical storage system is above the threshold amount, then drawing current from the element selected from the group consisting of batteries and ultracapacitors.

11. The method of claim 7, wherein the primary power source includes a combustion chamber, and wherein initiating the primary power source includes igniting a fuel/air mixture in a combustion chamber.

12. The method of claim 9, wherein the vehicle further comprises a braking system, and wherein electric current flows from the in-wheel motors to the electric storage system when the braking system is engaged.

13. The method of claim 1, wherein the vehicle further comprises a fuel pump and a combustion chamber, and further comprising:
terminating a flow of fuel from the fuel pump to the combustion chamber.

14. The method of claim 1, wherein the Sterling cycle engine is equipped with a crank shaft, and wherein, if an input selection is received to operate the vehicle in the hybrid mode, then:
determining whether the Sterling cycle engine is at a sufficient operating temperature to sustain a Stirling cycle; and if the Sterling cycle engine is at a sufficient operating temperature to sustain a Stirling cycle, then rotating the crank shaft to commence a sustained Sterling cycle.

15. The method of claim 14, wherein the Sterling-electric hybrid vehicle includes a starter, wherein an electrical current flow exists between the electric storage system and the starter, and further comprising:
reversing the electrical current flow between the electric storage system and the starter.

16. The method of claim 1, wherein the Sterling-electric hybrid vehicle includes a braking system and at least one electric wheel motor, and further comprising:
when the vehicle is turned on and the braking system is not engaged, routing electric current from the electric storage system to the at least one electric wheel motor; and
when the vehicle is turned on and the braking system is engaged, routing electric current from the at least one electric wheel motor to the electric storage system.

17. The method of claim 1, wherein the controller operates in conjunction with the solid state switching device to switch the mode of operation of the vehicle between the all-electric mode, the hybrid mode and a dormancy mode, and wherein receiving input selections to operate the vehicle in the all-electric mode or the hybrid mode further includes receiving input selections to operate the vehicle in the all-electric mode, the hybrid mode or the dormancy mode.

18. The method of claim 17, wherein the Stirling cycle engine includes a combustion chamber, and wherein, when an input selection is received to operate the vehicle in the dormancy mode, combustion is commenced in the combustion chamber without initiating a sustained Sterling cycle.

19. The method of claim 17, wherein the vehicle further comprises an exhaust system and a plurality of thermopile arrays which extract heat from the exhaust system, and wherein, when the vehicle is in the dormancy mode, the thermopile arrays generate electricity via the Seebeck effect.

20. A method for controlling the operation of a Sterling-electric hybrid vehicle, comprising:
providing a Sterling-electric hybrid vehicle which includes
(a) an electric storage system,
(b) a controller,
(c) a solid-state switching device,
(d) a plurality of power sources that includes a primary power source selected from the group consisting of Sterling cycle engines and Sterling cycle generators, and
(e) a plurality of powered devices selected from the group consisting of vehicle components and subsystems, wherein the controller operates in conjunction with the solid-state switching device to switch the mode of operation of the vehicle between an all-electric mode and a hybrid mode, and wherein the controller controls the operation of the plurality of power sources and the plurality of powered devices;
receiving input selections to operate the vehicle in the all-electric mode or the hybrid mode; and
if an input selection is received to operate the vehicle in the all-electric mode, then
(a) ascertaining the level of charge in the electrical storage system,
(b) if the level of charge in the electrical storage system is above a threshold amount, then initiating the all-electric mode, and (c) if the level of charge in the electrical storage system is not above a threshold amount, then producing an electrical current by initiating the primary power source;

wherein the controller operates in conjunction with the solid-state switching device to switch the mode of operation of the vehicle between the all-electric mode, the hybrid mode and a dormancy mode, and wherein receiving input selections to operate the vehicle in the all-electric mode or the hybrid mode further includes receiving input selections to operate the vehicle in the all-electric mode, the hybrid mode or the dormancy mode; and wherein the Stirling cycle engine includes a combustion chamber, and wherein, when an input selection is received to operate the vehicle in the dormancy mode, combustion is commenced in the combustion chamber without initiating a sustained Sterling cycle.

\* \* \* \* \*